United States Patent [19]

Drewel et al.

[11] Patent Number: 4,631,014
[45] Date of Patent: Dec. 23, 1986

[54] HYDRAULIC CURING PRESS

[75] Inventors: Günter Drewel, Seevetal; Horst Enoch; Klaus Grotkasten, both of Hamburg, all of Fed. Rep. of Germany

[73] Assignee: Fried. Krupp Gesellschaft mit beschrankter Haftung, Essen, Fed. Rep. of Germany

[21] Appl. No.: 800,464

[22] Filed: Nov. 21, 1985

[30] Foreign Application Priority Data

Nov. 30, 1984 [DE] Fed. Rep. of Germany ....... 3443730

[51] Int. Cl.⁴ ...................... B29C 33/28; B29C 35/00
[52] U.S. Cl. .................................. 425/34 R; 425/47; 425/49; 425/52; 425/395; 425/408; 425/450.1; 425/451.9
[58] Field of Search .................... 425/33, 34 A, 35, 36, 425/47, 49, 52, 406, 408, 450.1, 451.9, 395

[56] References Cited

U.S. PATENT DOCUMENTS

| 3,910,735 | 10/1975 | Caretta | 425/48 |
| 4,022,554 | 5/1977 | MacMillan | 425/36 |
| 4,238,174 | 12/1980 | MacMillan | 425/36 |
| 4,448,575 | 5/1984 | Hanyu et al. | 425/47 |
| 4,453,902 | 6/1984 | Imbert | 425/47 |

FOREIGN PATENT DOCUMENTS 2358702 12/1982 Fed. Rep. of Germany.

Primary Examiner—Willard E. Hoag
Attorney, Agent, or Firm—Karl F. Ross; Herbert Dubno

[57] ABSTRACT

A time curing press includes an upper mold part which is movably arranged by means of long-stroke cylinders relative to a lower mold part. Extending at a central area of the upper mold part and connected thereto is a vertical guide bar which is supported in a headpiece of the frame of the press. The guide bar is provided with a vertically adjustable not which is engaged by clamp jaws to lock the mold, i.e. the upper mold part with the lower mold part in the closed position of the press.

10 Claims, 7 Drawing Figures

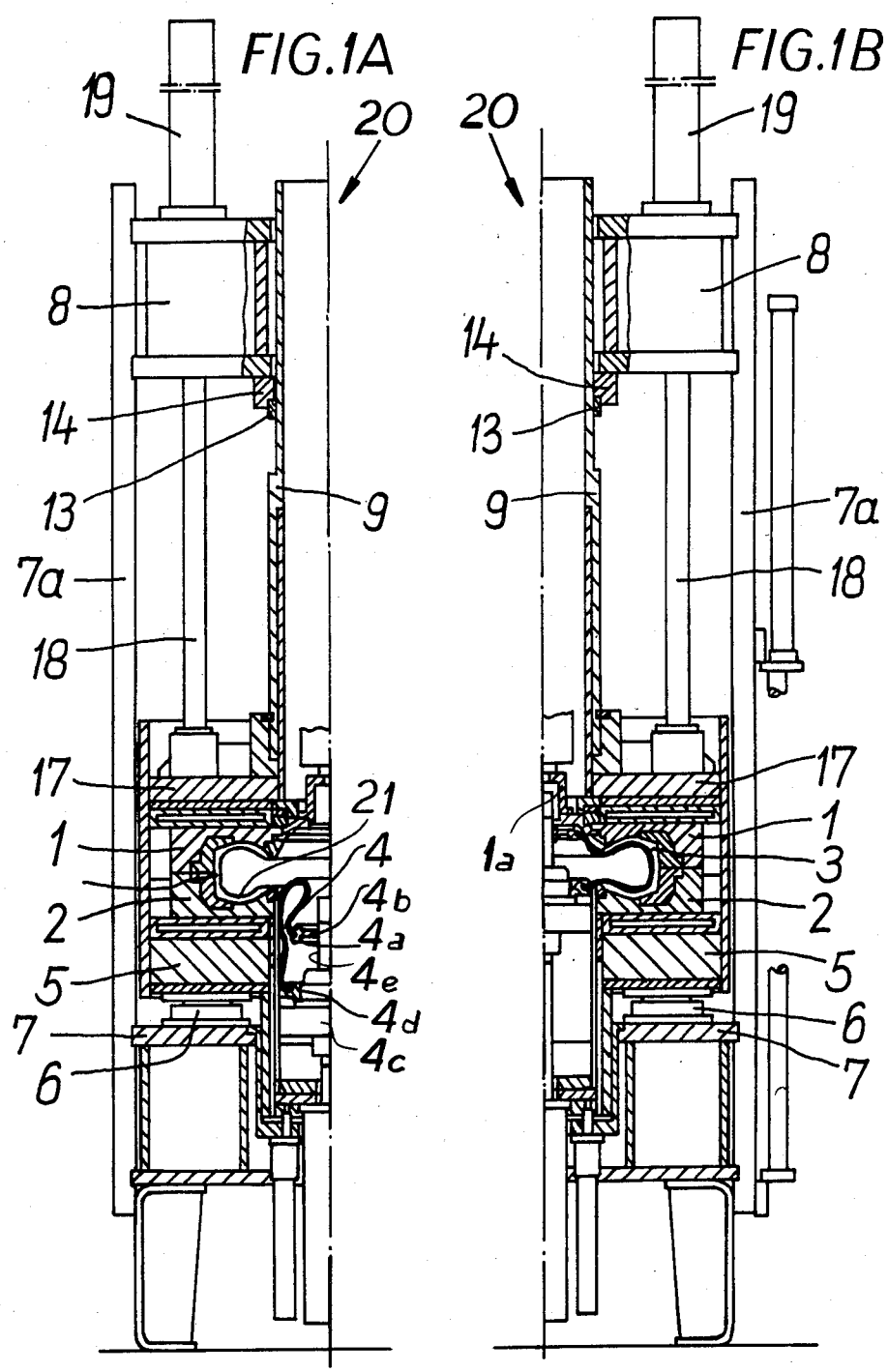

HYDRAULIC CURING PRESS

FIELD OF THE INVENTION

Our present invention is concerned with a hydraulic tire curing press for simultaneously molding and vulcanizing a tire.

BACKGROUND OF THE INVENTION

In known tire curing presses, an upper mold part is movably guided in vertical direction with respect to a lower mold part by means of long-stroke cylinders to allow opening and closing of the mold cavity. To provide mold parts in close contact during vulcanization of a tire, the upper mold part is locked in its closed position when being placed on the lower mold part. The mold pressure applied on the mold parts during vulcanization is provided by suitable pressing cylinders.

Practice has shown that in tire curing presses of this kind problems have been encountered to guide the upper mold part in an accurate manner so that mismatches of the two parts of the mold occurred, especially when the upper mold part is attached to a wide tie-bar. During starting of the press, considerable temperature drops are obtained between those areas subjected to heat and the cold parts so that respective tolerances play or clearance must be provided in dimensioning the guides in order to avoid jamming.

From the German Pat. No. 2 358 702 a system of tire curing presses is known in which the upper mold part is connected to a headpiece via lock cylinder devices and is guided along lateral plate-shaped portions of the press. This guidance necessitates a considerable tolerance because of the temperature rise which is to be expected during operation of the press in view of the wide distance of the guide surfaces. Moreover, the upper mold part supported in this manner performs transverse movements and thus becomes misaligned with the lower mold part. This results in inaccuracies during closing of the press and vulcanization of the tire.

OBJECT OF THE INVENTION

It is thus the principal object of my present invention to provide an improved tire curing press obviating the afore-stated drawbacks.

SUMMARY OF THE INVENTION

I realize this object according to the invention by providing a frame which supports a guide bar or post connected to the upper mold part at a central area thereof. The guide bar carries a vertically adjustable abutment nut which is engageable by a pair of opposing clamp jaws to lock the upper mold part when it is aligned with the lower mold part, upon closing of the mold cavity defined by the upper and lower mold parts.

The frame includes a pair of spaced side walls connected to each other at their upper portion by a transverse headpiece which supports and guides the guide bar in an accurate manner. The guidance is provided by a plurality of rollers connected to the headpiece and running along guide surfaces defined by flanks of the guide bar.

Through the provision of a guide bar arranged in accordance with our present invention, the upper mold part is guided in accurate alignment to the lower mold part thus preventing the problems inherent in prior art devices. The locking of the press is provided solely by the clamp jaws engaging with the nut screwed along the respective section of the guide bar. Since the nut can be set in any position, a continuous adjustment of the tire curing press to different tire shapes and sizes is provided.

According to the invention, the upper mold part is fixed to a pressure plate which is acted upon by piston rods sliding in respective long-stroke cylinders to move the upper mold part in vertical direction awway from the lower mold part for mold opening. Preferably, the piston rods are connected to the pressure plate via a joint connection to secure a trouble-free movement of the upper mold part during opening and closing of the tire curing press even when during starting and prior to reaching stationary temperature ranges, the cylinders show small deviations from their desired position.

According to a further feature of our present invention, the pressing cylinders which provide the proper mold pressure to maintain the mold in its locked position are arranged between the base of the press and the lower mold part. Such a design has the advantage that the pressing cylinders can be operated with a very low quantity of oil as their sole purpose is to maintain the mold pressure during vulcanization. An adjustment to various mold shapes is not required.

BRIEF DESCRIPTION OF THE DRAWING

The above and other objects, features and advantages of our present invention will become more readily apparent from the following description, reference being made to the accompanying drawing in which:

FIG. 1A is a cross-sectional view of the left-hand half of a tire curing press according to the invention, illustrating a tire blank prior to insertion of a bladder;

FIG. 1B is a corresponding section of the right-hand side showing the tire blank during vulcanization;

SPECIFIC DESCRIPTION

Figure 3:
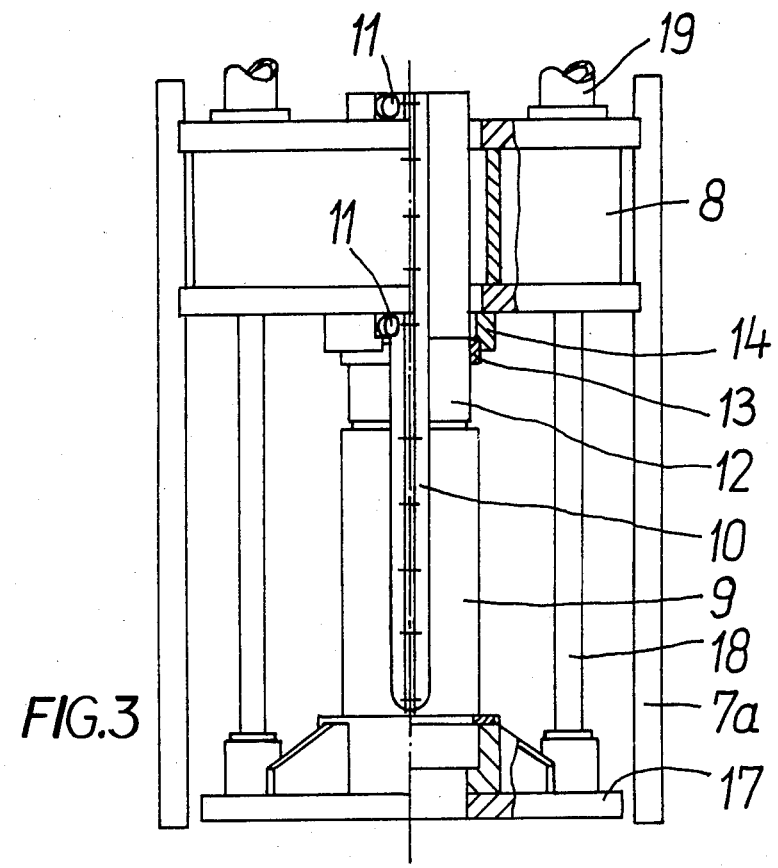
FIG. 3 is an elevation partly in cross section taken along the line III—III in FIG. 2.

In the drawing, we have shown a tire curing press generally designated by reference numeral 20 and provided for simultaneously molding and vulcanizing a tire blank 3. The tire curing press 20 includes a frame which is formed by two spaced side walls 7a extending parallel to each other in a vertical direction. Connecting the side walls 7a at their upper portion is a transverse headpiece 8 of rectangular cross section. At their lower end, the side walls 7a carry a transverse press body or base 7 which supports pressing cylinders 6. The pressing cylinders 6 communicate with a suitable hydraulic oil supply (not shown) to provide the mold pressure during vulcanization of the tire blank 3.

As shown in FIGS. 1A and 1B, the pressing cylinders 6 act upon a mold carrier 5 to which a lower mold part 2 is connected. The lower mold part 2 cooperates with an upper mold part 1 to define a mold cavity 21 in which the tire blank 3 is placed for subsequent camfering by means of a bladder 4. In FIG. 1, I have shown at the left-hand side the bladder 4 about to be inserted into the tire blank 3 while being arranged within the blank 3 during vulcanization at the right-hand side. The mechanism to actuate the bladder 4 is not shown in detail for reasons of simplicity.

However, as can be seen from FIGS. 1A and 1B, the bladder 4, which is composed of elastomeric material, is anchored at its upper edge bead 4a in a disk 4b which is carried upwardly by a plunger 4c also supporting the lower edge bead 4d of this bladder, although the shank 4e of the pressure 4c upon which the disk rides with lost motion, can be moved somewhat further upwardly if desired into a wall 1a of the upper mold part.

The pressure can effect the inflation of the bladder outwardly of a pressurized medium can be introduced through the pressure to hold the tire carcass against the walls of the mold.

The headpiece 8 is connected at each side with a long-strike cylinder 19 in which a piston rod 18 slides whose lower end remote to the cylinder 19 is mounted on a pressure plate 17 via a suitable link joint. Fixed to the pressure plate 17 is the upper mold part 1 which is movable in a vertical direction away from the lower mold part 2 by the cylinder-piston rod arrangements 18, 19 to allow access to the mold cavity 21.

Figure 6:
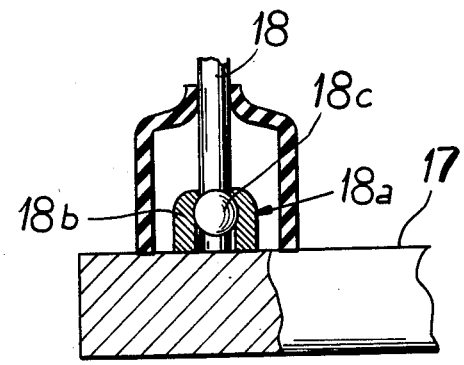
FIG. 6 is a detail section showing the articulation between one of the mold-opening and mold-closing piston rods and plates supporting the upper end portion.

As can be seen from FIG. 6, the articulation between each piston rod 18 and the plate 17 can be a ball joint 18a comprising a socket 18b fixed to the plate 17 and receiving the ball head 18c of the rod 18 so that a limited articulation is provided while allowing the application of compression and tension between the rod and the plate.

Extending parallel inbetween the piston rods 18 is a guide bar 9 which is connected with its lower end to the pressure plate 17 and thus is also in fixed relationship with the upper mold part 1. The upper end section of the guide bar 9 extends through a recess 22 which is provided in the headpiece 8 at a central area above the upper mold part 1.

During closing and opening of the tire curing press 20, i.e. of the mold cavity 21, the guide bar 9 is moved relative to the headpiece 8. In order to provide an accurate guidance of the guide bar 9 and thus of the upper mold part 2, the guide bar 9 is provided with a pair of guideways 10 arranged at opposing sides on the guide bar 9. Each guideway 10 is of essentially triangular cross section with its two guide surfaces 10a extending at an angle of preferably about 90°. Running along the guide surfaces 10a of each guideway 10 are a plurality of contact rollers 11 which are connected to the headpiece 8. Preferably, the headpiece 8 is provided with four upper and four lower rollers 11 to provide a very accurate centering and guidance of the guide bar 9. Although not shown in detail, we may note that the contact rollers 11 are connected to the headpiece 8 in an adjustable manner, e.g. by turning eccentric bearing bushings provided for the contact rollers.

Figure 4:
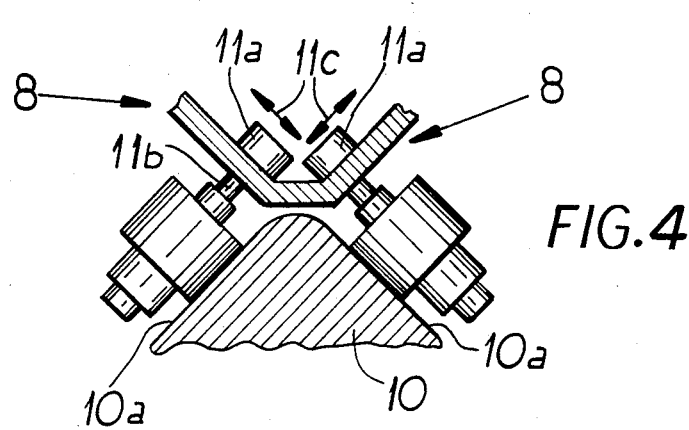
FIG. 4 is a detail section of the rollers or the head engaging the flanks of the axially extending ridges provided on the central post.

As can be seen from FIG. 4, for example, the head 8 can be provided with excentrics 11a in which the shafts 116 are journaled excentrically to the axes of rotation of the bushings 11a. It is thus possible to move these shafts closer to or further away from the flanks 10a of the ridge or guideway 10 against which these rollers rest. This movement is represented by the arrows 11c.

Figure 2:
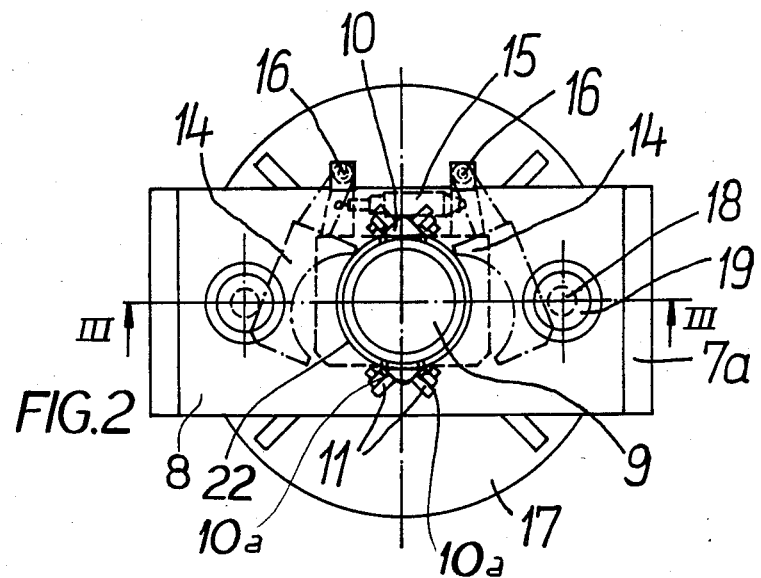
FIG. 2 is a top view of the tire curing press of FIG. 1.
Figure 5:
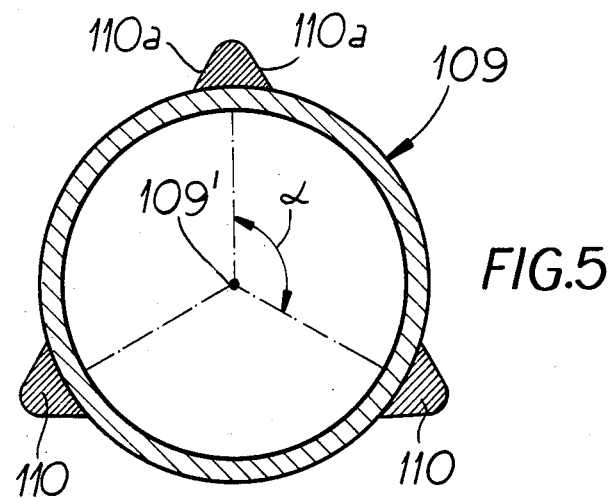
FIG. 5 is a section through the central post in accordance with another embodiment of the invention.

While the post 9 of FIGS. 1 and 2 has a pair of diametrically opposite ridges or ribs forming the guideways whose flanks are at right angles to one another, still greater precision can be provided with a post 109 (FIG. 5) whose ridges 110 also have flanks 110a including right angles with one another for engagement, each with two vertically spaced pairs of rollers 11 as previously described. The ridges 110 are here angularly equispaced about the axis 109' of the post.

As indicated in FIG. 2, the guide bar 9 is provided with a threaded section 12 which is of reduced diameter and carries an adjusting nut 13. Cooperating with the nut 13 are a pair of clamp jaws 14 which engage with the nut 13 to lock the latter when the mold part 1, 2 are in the closed position. The clamp jaws 14 are pivotable about joints 16 by a lock cylinder 15 and abut against the headpiece 8. In FIG. 2, the closed position of the jaws 14 is indicated by broken line while their open position is shown by a dot-dash line.

The tire curing press 20 according to the invention operates as follows:

after having closed the upper and lower mold parts 1, 2 and vulcanized the tire, the upper mold part 1 is opened by the piston rod 18 of the long-stroke cylinder 19. The jaws 14 are in their retracted or open position to release the nut 13. During the upward movement of the upper mold part 1, the guide bar 9 is simultaneously moved relative to the headpiece 8 whereby the contact rollers 11 run along the guide surfaces 10a. Since the guide bar 9 has a considerably smaller diameter than the distance between the side walls 7a of the frame, the tolerance or play provided between the guide bar 9 and the headpiece 8 to consider the temperature drop of the individual structural parts especially during starting of the tire curing press 20 can be selected with very small dimensions without encountering the danger of jamming along the guidance because of different thermal expansions.

Depending on the tire shape, the adjusting nut 13 is set along the threaded section 12 so as to be engaged by the jaws 14 once the tire blank 3 is placed into the mold cavity 21. The guidance of the upper mold part 1 during opening and closing of the press 20 is obtained essentially without any play by the control rollers 11 which run along the guideways 10 so that the upper and lower mold parts 1, 2 are in accurate alignment with each other. After having inserted the tire blank 3 into the cavity 21, the upper mold part 1 is lowered by the cylinder-piston arrangement 18, 19 and placed concentrically to and in accurate alignment with the lower mold part 2. The nut 13 has been adjusted to the tire shape and the jaws 14 are swiveled into their closed position to lock the tire curing press 20. Thereafter, the pressing cylinders 6 which are arranged between the press base 7 and the lower mold part 2 apply the mold pressure. We may note that the pressing cylinders act during the locking of the mold parts 1, 2 only via the adjusting nut 13.

We claim:

1. A hydraulic curing press for molding and vulcanizing a tire, comprising:
   a frame;
   a lower mold part connected to said frame;
   an upper mold part defining with said lower mold part a mold cavity;
   moving means for displacing said upper part in vertical direction with respect to said lower part so as to allow closing and opening of said mold cavity;
   means for accurately guiding said upper part during its displacement by said moving means and including a vertically extending guide bar connected to said upper part at a central area thereof and supported by said frame, said guide bar being provided with an adjusting nut along a predetermined section thereof; and clamping means for locking said upper part when the latter is closed against said lower part to close said cavity and including pivotable clamp jaws embracing said bar and engageable by said adjustng nut.

2. A tire curing press as defined in claim 1 wherein said frame includes a pair of spaced side walls and a headpiece which connects said side walls and is arranged above said upper and lower mold part, said guide bar being supported in said headpiece.

3. A tire curing press as defined in claim 2 wherein said headpiece provides a support for said stop jaws when said upper mold part is aligned with said lower mold part to close said cavity.

4. A tire curing press as defined in claim 2 wherein said headpiece is provided with a plurality of adjustable contact rollers, said guide bar being provided with vertically extending guide surfaces along which said rollers run.

5. A tire curing press as defined in claim 4 wherein said guide bar is provided with two guideways which oppose each other and are each provided with two guide surfaces arranged at an angle to each other.

6. A tire curing press as defined in claim 5 wherein said guide surfaces of each of said guideways are arranged at an angle of about 90° to each other.

7. A tire curing press as defined in claim 4 wherein said guide bar is provided with at least three of such guide surfaces arranged in rotationally symmetric manner.

8. A tire curing press as defined in claim 1, further comprising a pressure plate connected to said guide bar and carrying said upper mold part, said displacing means being long-stroke cylinders, each accommodating a piston rod sliding therein, said piston rods having one end remote to said cylinders connected to said pressure plate.

9. A tire curing press as defined in claim 8, further comprising joint means for hingedly connecting said one end of said piston rods to said pressure plate.

10. A tire curing press as defined in claim 2, further comprising a press base connected to said side walls at a lower section of said frame and pressing cylinders for providing the mold pressure during vulcanization of the tire, said pressing cylinders being arranged between said lower mold part and said press base and acting only via said adjusting nut during locking of said mold cavity.

* * * * *